United States Patent Office 3,186,270
Patented June 1, 1965

3,186,270
METHOD AND APPARATUS FOR CONTROLLING
THE MOVEMENT OF A TOOL MEMBER OF A
TOOL MACHINE
Wilhelm Bondy, Rte. des Daillettes 5,
Fribourg, Switzerland
Filed July 18, 1962, Ser. No. 210,646
Claims priority, application Switzerland, July 21, 1961,
8,579/61
15 Claims. (Cl. 82—14)

The present invention relates to an improved method and apparatus for controlling the movement of a work tool for shaping or otherwise processing workpieces and, more particularly, has reference to improved method and apparatus for controlling the movement of a turning tool of a turning lathe, of the type provided with a saddle preferably motor-driven in the direction of the axis of the turning lathe.

Nowadays numerous copying lathes are in operation. They require a templet for each workpiece form. It is not economically feasible to incur the cost for manufacturing such templets when producing a small series or number of workpieces. Additionally, also in other situations the problem arises of storing such templets in the event it is desired to reuse such at a later time.

Turning lathes and other tool machines are in use which employ complicated and expensive apparatus for controlling the tool movement through the agency of markings which are applied to a perforated or punched tape, magnetic tape or other recording or information carriers (so-called numerical or digit controlled tool machines).

The apparatus designed according to the present invention is featured in the combination of a conventionally arranged copy-slide or slide rest for supporting a turning tool which is movably mounted on a saddle in an inclined direction to the longitudinal axis of the turning lathe, and at an angle of preferably 45°, and in known manner is actuatable through an associated servo arrangement in dependence upon the movement of a feeler movable in the direction of movement of the copy-slide, with (a) A first device which is capable of continuously measuring the position of the saddle and upon coincidence of the measured value with a predetermined numerical or reference value applied to a recording carrier or information storage means delivers a change-over or reversing signal;

(b) Two parallel members which are likewise parallel to the axis of the turning lathe, of which one is rigidly connected with the lathe bed and the other is rigidly connected with the saddle; and (c) A second device which in addition to possessing an auxiliary slide member which is movably mounted parallel to the axis of the turning lathe and which is provided with a control surface which extends perpendicular to the axis of the turning lathe, is further provided with means for coupling the auxiliary slide member from one to the other of the previously mentioned members in response to a change-over signal delivered by the first device.

Accordingly, it is an important object of the present invention to provide an improved method and apparatus for controlling the movement of a tool member relative to a workpiece to shape such workpiece into desired configuration in a highly reliable and accurate manner.

Another important object of the present invention is to provide improved method and apparatus for controlling the movement of a turning tool of a turning lathe.

A further important object of the present invention is to provide improved means for reliably shaping a workpiece into desired form, which means are readily adaptable for installation on existing tool machines and economically suitable for producing a small series of workpieces.

Yet a further important object of the present invention is to provide improved means for controlling the movement of a tool member with respect to a workpiece to be shaped without requiring the use of specially manufactured templets.

Still another object of the present invention is to provide means for determining the position of a tool support member, means for comparing such acquired information with a reference value delivered from information storage means and adapted to deliver a changeover or reversing signal to coupling means operatively associated with an auxiliary slide provided with means adapted to displace a tool member into desired position relative to a workpiece to shape the latter into desired configuration.

A further important object of the present invention is to provide an improved arrangement for controlling the movement and arrest of a control surface adapted for initiating movement of a tool member into selected position, in accordance with the displacement of a saddle member.

Still further objects of the present invention and its entire scope and applicability will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
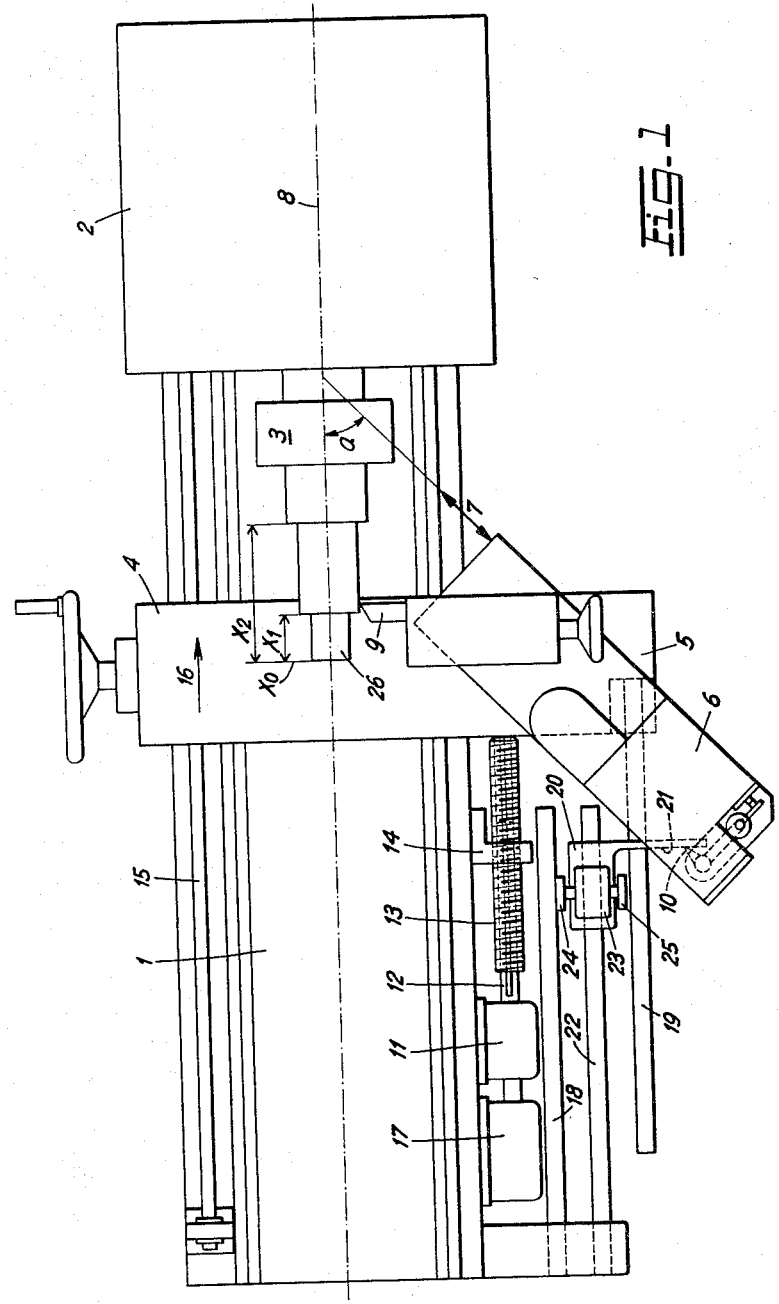
FIGURE 1 is an embodiment of the invention in schematic plan view.

Referring now to the drawings, reference numeral 1 designates the lathe bed, 2 the headstock, 3 the head of the workpiece carrying spindle, and reference numeral 4 the saddle of the turning lathe. At one end of the saddle 4 there is secured a guide plate 5, in any well known manner, on which a copy slide or slide rest 6 of conventional construction is movably guided in inclined direction to the longitudinal axis 8 of the turning lathe, for movement as generally indicated by the double headed arrow 7, and at an angle $a$ of preferably 45°. The turning tool which is tightly clamped on the copy slide or slide rest 6 is designated by reference numeral 9. The copy slide 6 is provided with a conventional servo apparatus, for example a hydraulic servo apparatus 30 (FIGURE 2), by means of which the copy slide 6 is moved in one or the other direction when and for such time as the associated feeler 10 is displaced in one or the other direction out of an initial or zero position with reference to the copy slide 6. The details of the aforedescribed arrangement, more specifically, the manner of securing the guide plate 5 to the saddle 4, as well as the internal structure of the hydraulic servo apparatus 30 for displacing the copy slide 6 are well known to the art. Since such of themselves do not relate directly to the underlying principles of the invention, nor are details thereof necessary for the understanding of the invention, and further, since such elements are well known to the art may be employed herein, a detailed discussion thereof would not appear to be warranted. Moreover, in the article of Kurt Häuser, entitled "Hydraulische Kopiersysteme mit Zweikantensteuerung," appearing in volume 1, pages 7–10, 1953 edition of the publication "Werkstatt und Betrieb," a number of such tool machine arrangements are shown and disclosed, and reference may be readily had thereto.

Then a "first" device is provided which is capable of measuring the position of the saddle 4 and upon coincidence of the measured value with a given numerical or reference value, for example codified on a punch card, a magnetic tape or other information storage means or recording carrier, delivers a change-over or reversing signal. Such apparatus or devices are well known to persons skilled in the art and for this reason need not be explained more fully herein. From such type of a device there has only been illustrated in the drawings a small electric motor 11, the shaft 12 of which is connected so as to be axially displaceable but fixedly rotatable (telescopic) with a threaded spindle or micrometer screw 13 which is threadable into a threaded hole or bore of an angle plate or bracket 14 attached to the lathe bed 1, so that it always remains in contact at its forward end with the saddle 4 during motorized feed movement of said saddle in the direction of the arrow 16, brought about through the intermediary of a conventional feed rod 15.

In device 17 the motor-shaft 12 operates for example upon counting wheels which have been assigned for the individual places (decades) of a number and which work together with electric means in order to always deliver the previously mentioned change-over or reversing signal upon agreement or correlation (coincidence) of a measured value (actual value) of the coordinate of the saddle 4 with a numerical value (reference value) stored on the recording carrier. Instead of such an arrangement the shaft member 12 could drive a rotating arm in the comparing device 17 which in a predetermined angular position corresponds to the predetermined numerical value of the coordinate of the saddle 4, and in turn actuates a microswitch for example to thereby deliver the desired change-over or reversing signal. As will readily suggest itself to those skilled in the art, numerous other possibilities are available for comparing the coordinates of the saddle 4 (as actual value) in successive steps with applied numerical values (reference values) which have previously been codified on a record carrier, in order to deliver a change-over signal every time coincidence thereof appears. Devices for the positional control of machine tools employing punched cards or tape upon which is stored reference value information which is then compared with an actual measured value, and upon coincidence of these two values there is delivered a change-over signal for positioning the machine tool are known to the art and familiar to those persons skilled in the art of numerically controlling machine tools. For instance, attention is directed to the "Engineers Digest Survey Number 5," second edition, 1959, entitled "The Numerical Control of Machine Tools," by R. C. Brewer, illustrating and describing therein systems for the positional control of machine tools by means of punched paper tape. Furthermore, reference may be had to the February 1962 edition of "Control Engineering" and the article "Numerical Control," by H. W. Mergler, appearing at pages 98–104, listing numerous United States patents significant in this art.

The apparatus of the invention is further provided with two rod-shaped members 18, 19 for example, which are parallel to the longitudinal axis 8 of the lathe, and of which one, for example member 18, is fixedly connected with the lathe bed 1 and the other, namely member 19, is rigidly connected with the saddle 4.

The arrangement is further provided with a "second" device which comprises an auxiliary slide 20 possessing relatively low mass and which is provided with a control surface 21 for the feeler 10, which control surface extends perpendicular to the longitudinal axis 8 of the turning lathe, and which is displaceable with as little friction as possible on a guide bar or rod 22 also arranged parallel to the axis 8 of the turning lathe. The guide bar 22 in the illustrated embodiment is connected to the lathe bed 1, but it is to be appreciated could be equally well connected to the saddle 4 without affecting the desired result. This "second" device further exhibits means 23, which for example may be formed from a double acting electromagnet arranged on the auxiliary slide 20 and two brake shoes 24, 25 attached on diametrically opposed ends of the armature or tie-rod of this electromagnet, in order to couple the auxiliary slide 20 to one or the other of the members 18 or 19 in response to a change-over signal received from the "first" device, as will be explained in greater detail hereinafter.

In order to more fully explain the operation of the apparatus, it has been assumed for the sake of simplicity that a workpiece 26 is to be processed, the diameter of which is to increase with flat shoulders from the tailstock in the direction of the headstock. The measurements or coordinates for the workpiece 26 are taken with reference to the left end $X_0$. The coordinate at the first shoulder is then $X_1$, that at the second shoulder $X_2$ and so forth. $X_0=0$ signifies that in the position at the beginning of the working operation the measuring apparatus is set at "zero."

The (codified) markings for the numerical or reference values of the record carrier are so applied that a change-over signal is only initially delivered upon reaching the coordinate $X_1$. Thus, until such time the auxiliary slide 20 remains rigidly connected with the saddle 4 due to coupling thereof with the member 19. This also means that the control surface 21 remains stationary with respect to the saddle 4, as well as the fact that the copy slide 6 and the tool 9 also remain stationary with respect to the saddle 4, and for this reason the surface turned at the workpiece 26 is cylindrical.

Upon reaching the coordinate $X_1$ the coupling means 23 provided with the brake members 24, 25 receive a change-over signal which induces it to immediately uncouple the auxiliary slide 20 from the member 19 and to couple such to the stationary member 18, in the position indicated in FIGURE 1. The now stationary control surface 21 then works exactly as a control surface of a conventional, stationary mounted copy templet. Since this control surface 21 according to design extends perpendicular to the axis 8 of the turning lathe, the copy slide 6 together with the turning tool 9 is so moved on the saddle 4 that the radial shoulder results. If the angle $a=45°$ then for a radial movement $\Delta r_1$ of the turning tool 9 at the coordinate $X_1$ then the saddle 4 moves an equal amount $\Delta r_1$. As soon as the coordinate of the saddle reaches the value $X_1+\Delta r_1$ the means 23 receives a change-over signal which causes it to uncouple the auxiliary slide 20 from member 18 and to couple it to member 19, so that from then on a cylindrical surface again results on the workpiece 26. As soon as the saddle 4 has moved through the path $X_2+\Delta r_1$ the means 23 receives the change-over signal which causes it to again uncouple the auxiliary slide 20 from the member 19 and to again couple such to the member 18. The radius difference of the second shoulder at the coordinate $X_2$ amounts to $\Delta r_2$. When the saddle 4 has moved through the path $X_2+\Delta r_1+\Delta r_2$ the means 23 receives a change-over signal that causes it to uncouple the auxiliary slide 20 from member 18 and to couple it to member 19.

It is readily to be recognized that gradual increases of the diameter of the workpiece can be considered as small gradations with $a\Delta X$ and $a\Delta r$, so that for obtaining such shapes only the record carrier need be applied with corresponding numerous and valuable, closely situated markings and the "first" as well as the "second" device must be able to react in a correspondingly quick and precise manner.

Figure 2:
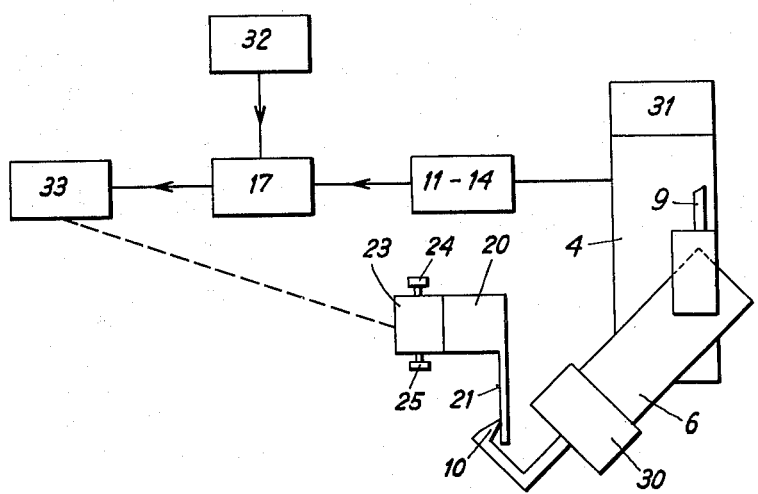
FIGURE 2 is a block diagram illustrating various components of the apparatus depicted in FIGURE 1 for controlling the movement of a tool member.

In FIGURE 2 there is schematically illustrated a block diagram of an arrangement for carrying out the teachings of the present invention. Thus, an inspection of this FIGURE will reveal that the saddle member 4 can be displaced in the longitudinal axis of the turning lathe by a suitable drive motor 31 for example. Of course, the saddle 4 could, if desired or advisable, be moved by means of a hand wheel. The copy slide 6 which supports the work tool 9 is movably arranged on the saddle 4 at a predetermined angle $a$ with respect to the axis of the bed 1 (FIGURE 1), as previously mentioned an angle which is preferably 45° but can also assume other values, and is driven in the direction of double-headed arrow 7 by means of the aforementioned hydraulic servo-motor 30 for example. The actuation of the servo-motor 30 is in response to the displacement of the feeler member 10 out of its initial or zero position. Such displacement of the feeler member 10 occurs wherever the coupling means 23 are coupled with the guide rail 18, so that the control surface 21 will initiate actuation of the feeler member 10. It will be appreciated that the coupling means 23 need not couple the auxiliary slide 20 to the rail member 18, but could conceivably couple such to a stationary surface, as for example directly to the bed 1 of the lathe.

Additionally, there are provided the measuring means 11–14 for determining the displacement of the saddle member 4 and which feed the acquired information to comparing means 17 which compares the actual value of the movement of the saddle 4 with a reference value received from the information storage or record carrier means 32, the latter of which has information stored in the form of digital reference values upon a perforated card or tape for example. The comparing means 17 then compares the information received from the information storage means 32 (reference value) with the saddle position measuring means 11–14 (actual value), and upon coincidence thereof delivers a suitable change-over or reversing signal to a suitable control device 33 which then actuates the coupling means 23, which in the embodiment shown is in the form of a double acting electromagnet for example.

For normal or more standard shapes (for example, Morse taper shanks) the values of $\Delta X$ and $\Delta r$ can be compiled in tables which can then be supplied to the customer together with the apparatus. It is readily to be appreciated and understood that the angle $a$ must not equal 45°. For example, if it assumes the value of 30° then a value of $\Delta r$ corresponds to a value of $\Delta X$ which equals $2\Delta r$.

The previous description should make it manifest that the arrangement of the present invention is particularly suitable for controlling the movement of a work tool and positioning it properly with reference to a workpiece in order to shape or process such workpiece into desired form. Further, the apparatus of the present invention can easily be incorporated on existing tool machines, such as turning lathes as described herein.

Having thus described the present invention what is desired to be secured by United States Letters Patent, is:

1. In the art of shaping a workpiece by means of a tool member supported for movement on a slide member movable at an inclination of predetermined angular relationship with respect to the longitudinal direction of movement of a supporting member for said slide member, the method of properly positioning said tool member with respect to the workpiece, which method comprises: displacing said supporting member in longitudinal direction, continually measuring the actual value of the displacement of said supporting member, comparing the measured actual value with a digital reference value, deriving a control signal upon coincidence of said measured actual value with said reference value, coupling a guide surface which normally travels with said supporting member and which is disposed at approximately right angles to the longitudinal direction of movement of said supporting member by means of said control signal to a stationary surface to thereby arrest movement of said guide surface, said guide surface in arrested condition partaking the function of a control templet, and then moving said tool member into desired position with respect to said workpiece with the aid of the arrested guide surface.

2. In combination, a bed, a saddle mounted for movement on said bed in the direction of the longitudinal axis of said bed, an auxiliary slide, a control surface provided for said auxiliary slide, means movably supporting said auxiliary slide, and coupling means cooperating with said auxiliary slide for selectively and alternatingly coupling the latter in operable relation with said bed and said saddle.

3. In combination, a bed, a saddle mounted for movement on said bed in the direction of the longitudinal axis of said bed, an auxiliary slide, a control surface supported by said auxiliary slide extending perpendicular to said longitudinal axis, means for movably supporting said auxiliary slide, and coupling means cooperating with said auxiliary slide for selectively and operatively connecting said auxiliary slide to said bed and said saddle.

4. In combination, a bed, a saddle mounted for movement on said bed in the direction of the longitudinal axis of said bed, an auxiliary slide, a control surface provided for said auxiliary slide, said control surface extending substantially perpendicular to said longitudinal axis, means suporting said auxiliary slide for movement parallel to said longitudinal axis of said bed, and coupling means cooperating with said auxiliary slide for coupling the latter in operable relation to said bed so as to be stationary or said saddle for movement therewith.

5. In combination, an axially movable saddle member, a slide member arranged for movement on said saddle member at a predetermined angular inclination to the axial direction of movement of said saddle member, tool means supported by said slide member, drive means for moving said slide member in said inclined direction, drive means for moving said saddle member, means for measuring the movement of said saddle member, information storage means, comparing means operatively associated with said measuring means and said information storage means for comparing the actual value of movement of said saddle member with a reference value delivered from said information storage means, means for actuating said drive means for said slide member, and control means for receiving a change-over signal from said comparing means when coincidence of said actual value and said reference value occurs for operating said actuating means for said drive means of said slide member to control operation of said last-mentioned drive means.

6. In combination, a saddle member supported for movement in a predetermined direction, a slide member arranged for movement on said saddle member at a predetermined angular inclination to said predetermined direction, tool means supported by said slide member, drive means for moving said slide member in said inclined direction, means for moving said saddle member, means for continuously measuring the movement of said saddle member, information storage means, comparing means operatively associated with said measuring means and said information storage means for comparing the actual value of movement of said saddle member with a reference value delivered from said information storage means, means for actuating said drive means for said slide member, said actuating means including a movable auxiliary slide, and control means for receiving a change-over signal from said comparing means when coincidence of said actual value and said reference value occurs to actuate said actuating means for said drive means to control operation of said drive means.

7. The combination according to claim 6; wherein said predetermined angular inclination of said slide member with respect to said predetermined direction defines an angle of 45°.

8. The combination according to claim 6; wherein said actuating means for said drive means of said slide member further includes control surface means secured for movement to said auxiliary slide, feeler means operatively connected with said drive means and in contact with said control surface means, and coupling means provided for said auxiliary slide for selectively operably coupling said auxiliary slide either to a stationary member or to said saddle member for movement therewith.

9. The combination according to claim 8; wherein said stationary member is a machine bed.

10. The combination according to claim 9; wherein a support rod is fixedly connected to said machine bed and to which said auxiliary slide is capable of being coupled.

11. The combination according to claim 8; including a support rod fixedly connected to said saddle member and to which said auxiliary slide is capable of being coupled.

12. The combination according to claim 6; wherein said measuring means includes a drive motor including a driven shaft, a hollow threaded spindle mounted for rotation on said driven shaft, said driven shaft extending telescopically through said hollow threaded spindle and being axially movable with respect thereto.

13. Apparatus for controlling the movement of a turning tool of a turning lathe comprising a bed, a saddle member movably supported on said bed, means for moving said saddle member in the direction of the longitudinal axis of said lathe, a slide member adapted for holding a turning tool movably guided on said saddle member, said slide member being movable in inclined direction to said longitudinal axis of said lathe and at a predetermined angle with respect thereto, feeler means operatively connected with said slide member and movable in the direction of movement thereof, servo means for displacing said slide member in dependence upon the movement of said feeler means, a first device capable of continually measuring the position of said saddle member and upon coincidence of the measured value with a given digital reference value applied on an information carrier delivers a changeover signal, two parallel members which are also parallel to the longitudinal axis of said lathe, one of which is fixedly connected with said bed and the other fixedly connected with said saddle member, and a second device provided with an auxiliary slide movably guided parallel to said longitudinal axis of said lathe and provided with a control surface which extends perpendicular to said longitudinal axis, said second device being further provided with means for coupling said auxiliary slide from one to the other of said parallel members in response to said change-over signal delivered from said first device.

14. Apparatus according to claim 13; wherein said predetermined angle is preferably 45°.

15. Apparatus according to claim 13; wherein said moving means for said saddle member is a drive motor.

References Cited by the Examiner
UNITED STATES PATENTS

| 647,975 | 4/00 | Liebert et al. | 90—24.5 |
| 2,450,096 | 9/48 | Siekmann et al. | 82—14 |
| 2,592,770 | 4/52 | Waldie et al. | 82—14 X |
| 2,927,258 | 3/60 | Lippel | 90—13.99 |

FOREIGN PATENTS

| 619,088 | 4/61 | Canada. |
| 1,114,501 | 12/55 | France. |

ANDREW R. JUHASZ, *Primary Examiner.*

LEON PEAR, *Examiner.*